United States Patent [19]
Weidman

[11] 3,785,838
[45] Jan. 15, 1974

[54] INORGANIC REFRACTORY FIBROUS COMPOSITIONS

[75] Inventor: V. Wesley Weidman, Wilmington, Del.

[73] Assignee: E. I. du Pont de Nemours and Company, Wilmington, Del.

[22] Filed: Nov. 4, 1971

[21] Appl. No.: 195,864

[52] U.S. Cl............ 106/55, 106/65, 106/67, 106/68, 106/69
[51] Int. Cl................................. C04b 43/02
[58] Field of Search.......... 106/65, 69, 55, 67, 106/68

[56] References Cited
UNITED STATES PATENTS

| 3,231,401 | 1/1966 | Price et al............. | 106/69 |
| 3,445,250 | 5/1969 | Preece.................. | 106/69 |
| 3,507,944 | 4/1970 | Moore................... | 106/69 |

*Primary Examiner*—James E. Poer
*Attorney*—James L. Jersild

[57] ABSTRACT

Inorganic fibers such as mineral wool are bonded in a coherent mass with a binder such as colloidal positively charged particles having a silica core and a coating of a polyvalent metal-oxygen compound. The binder is flocculated from solution onto the fibers by agents such as attapulgite or hectorite. These inorganic structures retain their strength at temperatures as high as 2300°F.

12 Claims, No Drawings

INORGANIC REFRACTORY FIBROUS COMPOSITIONS

BACKGROUND OF THE INVENTION

This invention relates to compositions primarily of inorganic fibers held in a coherent mass by a binder. This compositions are useful as insulation panels, molds and other structural elements which must be capable of withstanding high temperatures. U.S. Pat. No. 3,100,734 teaches the use of colloidal silica as a binder for refractory fiber structures. While the patent alleges the structures so made are suitable for temperatures as high as 2300°F several problems arise. It is difficult to deposit all of the colloidal silica from solution onto the fibers. Thus some silica remains in solution and is lost. Further, to impart additional strength to the articles the patent teaches addition of an organic binder in addition to the silica. This binder is burned off in use and the strength it imparts is lost.

U.S. Pat. No. 3,224,927 suggests the use of starch to cause silica binders to precipitate onto the refractory fibers. While this cuts down on silica use and provides adequate strength it also decreases the maximum temperature at which the structure can be used to about 1000°F. An improvement in working temperature from 1000° to 1700°F was achieved by substitution of inorganic fibrous potassium titanate for the starch as a flocculent. This flocculent was compatible with binders such as positively charged colloids having a dense silica core coated with a polyvalent metal-oxygen compound. The use of potassium titanate as a flocculant is taught in Defensive Publication No. 724,222. However, even these improved systems could not completely exhaust all of the binder into the fibers and the resulting structure could not be used at gas flame temperatures, 2000°–2300°F.

SUMMARY OF THE INVENTION

Totally inorganic fibrous refractory compositions consisting essentially of 50 to 98 parts by weight fibers and 2 to 50 parts by weight binder plus flocculent where the weight ratio of binder to flocculent is from 3:1 to 1:5 are useful for high temperature applications. Binders for these structures are positively charged colloidal particles of silica coated with a polyvalent metal-oxygen compound, boehmite alumina, amorphous fumed alumina and basic aluminum chloride. Suitable flocculents are negatively charged clay-minerals such as montmorillonite, saponite, hectorite and attapulgite. The term "consisting essentially of" is intended to indicate the essential components of the compositions of this invention but is not intended to exclude other components which can be added without detracting from the use of the compositions of this invention as refractory articles.

These structures can be made by first forming a dilute (1–5 percent solids) aqueous slurry of inorganic fibers, and adding the positively charged binder. Usually the binder is added as an aqueous suspension. After the binder is mixed with the fiber slurry the flocculent is added. The slurry with all ingredients added is mixed for an additional 5 to 30 minutes and the refractory objects are vacuum formed on a screen. The moist cake formed can be dried as is or it can be shaped further by molding on forms, wrapping on mandrels or the like, and then dried.

DESCRIPTION OF THE PREFERRED EMBODIMENTS

The refractory compositions of this invention have as their major constituent inorganic fibers. The particular inorganic fiber selected is not critical so long as it is capable of withstanding temperatures at which the finished composition is to be used. Fibers such as alumino silicates, mineral wool, fiber glass, asbestos and quartz can be used. In the process for making the compositions of this invention the refractory fibers are charged as dilute aqueous slurries. To assure uniformity in the compositions the fibers should be as completely disaggregated as possible. Thus vigorous agitation of the fiber slurry is desirable.

The binders useful in this invention are all positively charged inorganic colloids. Colloidal silica coated with a polyvalent metal-oxygen compound, amorphous fumed alumina, boehmite alumina and basic aluminum chloride are useful in this invention. The coated colloidal silica is available in the form of an aquasol of pH 2.5 to 7. Outside of this pH range the sols tend to be unstable. Negatively charged colloidal silica is coated with a sufficient amount of a polyvalent metal-oxygen compound to impart a positive charge to the coated particle. The metals are present as oxides, hydroxides or hydrated oxides. The metals useful for preparing these sols have valence of 3 or 4. Examples are aluminum which is the preferred metal, chromium, titanium and zirconium. These sols are described in Alexander and Bolt, U.S. Pat. No. 3,007,878. The particle size is 2 to 100 millimicrons and the sols are available in 5 to 50 percent solids concentrations. These sols may be added to the slurry of refractory fibers either in their connected commercial form or diluted. This is the preferred binder.

Alumina in several forms is a suitable binder. One is boehmite alumina monohydrate. This product and its preparation are described in U.S. Pat. No. 2,915,475. Boehmite alumina is also a commercially available product having the name DISPAL. The alumina fibers described in the patent are on the order of from 100 to 1000 millimicrons in length and on the order of 10 millimicrons in diameter. Another useful form of alumina is colloidal fumed alumina. These materials when used as binders may be charged to the fiber slurry as the commercial solid particulate matter or as an aqueous dispersion.

Basic aluminum chloride, $Al_2OH_5Cl$ is also a useful binder in this invention. While it would seem that this is not a positively charged colloid, when the described compound is dispersed in water it is present as colloidal polymeric cations with the chloride ions in solution. This material is commercially available either as a solid or liquid.

Because of the efficiency of the flocculating agents of this invention, 90 to 95 percent of the suspended binder is exhausted onto the refractory fibers. Thus the amount of binder charged to the slurry should be 5 to 10 percent greater than the amount desired in the final composition. Flocculents of the prior art are unable to achieve this high rate of binder exhaustion, and thus their use requires that greater amounts of binder be used. This often causes increased viscosity and difficult filtration of the slurry. For example, fibrous potassium titanate as a flocculent only exhausts about 85 percent of the binder in the slurry.

The flocculents useful in this invention are specific clay-type minerals which are negatively charged colloids. The particular materials which are effective as montmorillonites, saponites, attapulgites and hectorites. By montmorillonite is meant a mineral of the approximate formula

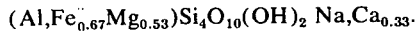

$$(Al,Fe_{0.67}Mg_{0.53})Si_4O_{10}(OH)_2 \, Na,Ca_{0.33}.$$

More particularly, this mineral is a bentonite clay having a high degree of exchangeable sodium associated with it. Typical of this material is the type found in the Black Hills area of the United States. The general formula shown above approximately describes the Black Hills montmorillonite. Montmorillonite found elsewhere may vary somewhat from the formula shown, and the term as used herein is not limited to minerals of the specific formula shown or to minerals from a specific geographical area. However, the general formula and geographic source provide a convenient method of designating the type of mineral encompassed within the term montmorillonite. Montmorillonite is a preferred flocculent because it is inexpensive.

Another useful flocculent is attapulgite, the principal mineral in attapulgus clay. Attapulgus clay is found in Georgia and Florida and in the Ural mountains in the U.S.S.R. This mineral, like montmorillonite, is primarily a hydrated magnesium aluminum silicate. However, the crystalline structure differs and, unlike the montmorillonite, attapulgite has a low level of associated exchangeable metal ions and does not swell in water. The formula for the ideal attapulgite is

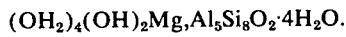

$$(OH_2)_4(OH)_2Mg,Al_5Si_8O_2 \cdot 4H_2O.$$

Of course, individual samples of attapulgite may vary from this general formula depending on their source and treatment. Attapulgite is described in detail in Industrial and Engineering Chemistry 59 pp 59–69, Sept., 1967.

Another mineral useful as a flocculent in this invention is hectorite. This mineral is sodium magnesium fluorolithosilicate. The lattice structure is of the montmorillonite type but hectorite differs from the common montmorillonites in that it contains almost no aluminum. It is substituted with lithium and has fluorine substituted for some hydroxyl groups in the lattice. This material has a high level of exchangeable sodium. It is found in the Mojave desert of California.

A fourth mineral useful as a flocculent in this invention is saponite. This mineral, like hectorite, has a montmorillonite type of lattice. In saponite magnesium is substituted for aluminum causing distortion of the lattice. Saponites from various locations and differing somewhat in composition are described in *Silicate Science, Vol. I*, W. Eitel, Academic Press, 1964, pp 234ff. Saponite is the most effective flocculent.

In addition to the basic ingredients of the composition of this invention, inorganic fillers may be included. Materials such as zircon, alumina bubbles, zirconia, mullite, vermiculite and perlite may be included by adding them to the dilute fiber slurry. Further, other types of refractory materials such as silica may be coated onto the surface of the refractory structures of this invention. Care should be exercised so that fillers which would detrimentally interact with the binder in the fiber slurry are not used. For example, a negatively charged silica sol would cause gelation of the positively charged binders of this invention before the binder could be exhausted onto the fibers by the flocculent.

The totally inorganic structures of the compositions of this invention may be used at temperatures as high as 2300°F without smoking or significant strength loss or shrinkage. The compositions of the prior art using organic binders or flocculents could not be used at these elevated temperatures.

The following examples further illustrate this invention. All parts and percentages are expressed on a weight basis unless otherwise noted. The modulus of rupture data was obtained by breaking test bars (dimensions 1 inch × 1 inch × 6 inches as cut from the vacuum formed pads) on an Instron Machine. Using a 4 inch span (distance between the two supports under the test bar) and a crosshead speed of 0.1 inch/min, the test bar was center loaded to failure in flexure. Modulus of rupture values were calculated using the following formula:

$$R = (3 \, Wl)/(2 \, bd^2)$$

where:
$R$ = modulus of rupture in lbs/inch$^2$
$W$ = load in pounds at which the specimen failed
$l$ = distance (span) in inches between the center-lines of the lower bearing edges
$b$ = width of specimen in inches
$d$ = depth of specimen in inches

EXAMPLE 1

A dilute slurry was prepared containing 2 lbs "Fiberfrax" aluminosilicate refractory bulk fiber in 111 lb water. To this slurry, 0.53 lb of Du Pont Positive Sol 130M (30 percent solids), an acidic aqueous dispersion of positively charged colloidal particles consisting of a dense silica core coated with positively charged polymeric alumina, was added with good stirring, which was continued for 5 minutes. Next, 0.2 lb of "Volclay" sodium exchangeable bentonitic clay (KWK Grade), a montmorillonite type mineral, was added to the slurry with good stirring, as a 6 percent (solids) colloidal (negatively charged) suspension in water. After 30 additional minutes of stirring, a test pad (dimensions 9½ inch diameter × approximately 1½ inch thick) was prepared in the slurry by vacuum forming techniques. A 240 mm porcelain Buchner funnel containing a fitted bronze screen (70/52) was attached by means of a rubber hose to an aspirator pulling a vacuum of about 29 inches of water. This suction mold assembly was immersed upside down in the slurry. Within about 2-minutes' time, a pad of sufficient thickness (≈1½ inches) had formed on the bronze screen. The mold containing the wet test pad was then withdrawn from the slurry with vacuum still applied. After about 15-seconds, excess water had been removed by the suction and the damp pad was recovered from the mold. The pad was transferred to a perforated metal plate support and dried in an oven. After thoroughly drying the pad at a temperature of about 250°F, test bars (dimensions 1 inch × 1 inch × 6 inches) were cut from the pad and weighed. Strength, density, and shrinkage properties of this composite product are given below. (Ratio by weight of ceramic fiber: positively charged binder: negatively charged flocculent = 100/8/10).

Density = 21.6 lbs/ft$^3$
Fired (linear) shrinkage (two hours at 2300°F) = 5.3 percent
Modulus of rupture — dry = 85 psi Fired four hrs. at 1000°F = 112 psi
Fired two hrs. at 2300°F = 121 psi

EXAMPLES 2 - 11

Example 1 was repeated using varying ratios between the ceramic fiber, the positively charged Du Pont Positive Sol 130M binder and the negatively charged "Volclay" mineral flocculent.

Chemical Co.) was added with good stirring. Next, 0.2 lb of "Volclay" bentonite was added with stirring, as a 6 percent solids suspension in water. A pad was formed and tested as described in Example 1 above. The ratio by weight of constituents in this product was 100 parts ceramic fiber: 5 parts positively charged "Chlorhydrol" binder: 10 parts negatively charged "Volclay" mineral flocculent. The results are as follows:

| Example | Wt Ratio of Fiber/Binder/Flocculent | Density Lbs/Ft$^3$ | Modulus of Rupture, psi | | | Fired Linear Shrinkage % |
|---|---|---|---|---|---|---|
| | | | Dry | 4 Hr at 1000°F | 2 Hr at 2300°F | 2 Hr at 2300°F |
| 2 | 100/4/6 | 15 | 31 | 42 | 66 | 4.1 |
| 3 | 100/6/8 | 17.5 | 48 | 65 | 93 | 4.4 |
| 4 | 100/8/6 | 20 | 61 | 80 | 99 | 4.8 |
| 5 | 100/8/8 | 22.5 | 72 | 87 | 80 | 7.0 |
| 6 | 100/8/12 | 24 | 96 | 137 | 112 | 4.3 |
| 7 | 100/10/10 | 20 | 100 | 133 | 121 | 7.0 |
| 8 | 100/15/18 | 22.5 | 101 | 115 | 92 | 5.3 |
| 9 | 100/0/0 (Control) | — | — | — | — | — |
| | | | | | (Sample too weak to test) | |
| 10 | 100/0/10 (Control) | 11.5 | 9 | 13 | 20 | 1.5 |
| 11 | 100/10/0 (Control) | — | — | — | — | — |
| | | | | | (Sample too weak to test) | |

EXAMPLE 12

A dilute slurry was prepared containing two lbs "Fiberfrax" aluminosilicate refractory bulk fiber in 104 lbs water. To this slurry, 0.8 lb of a 10 percent acidic suspension of "Dispal" Continental Oil Company's dispersible high-purity boehmite alumina monohydrate powder in water was added with good stirring. Then, 0.12 lb of "Volclay" bentonite was added to the slurry with stirring, as a 6 percent suspension in water. A test pad was prepared and tested as described in Example 1 above. The ratio by weight of constituents in this example was 100 ceramic fiber: 4 positively charged "Dispal" binder solids: 6 negatively charged "Volclay" mineral flocculent, which is the same ratio as Example 2 above. The results are as follows:

Density = 17.3 lbs/ft$^3$
Fired linear shrinkage, two hrs. at 2300°F = 3.3 percent
Modulus of rupture, dry = 29 psi
  Fired four hrs. at 1000°F = 34 psi
  Fired two hrs. at 2300°F = 35 psi

EXAMPLE 13

A dilute slurry was prepared as described in Example 12 above, except that 0.265 lb of a 30 percent suspension of "Cab-O-Grip", Cabot Corporations's fumed alumina, in water was substituted for the 10 percent "Dispal" dispersion. The same ratio of ceramic fiber: binder: flocculent results, i.e., 100/4/6 by weight. The results are given below:

Density = 13.3 lbs/ft$^3$
Fired linear shrinkage, two hrs. at 2300°F = 2.7 percent
Modulus of rupture, dry = 17
  Fired four hrs. at 1000°F = 21
  Fired two hrs. at 2300°F = 20

EXAMPLE 14

A dilute slurry was prepared containing two lbs "Fiberfrax" ceramic fiber in 108 lbs water. To this slurry, 0.42 lb of "Chlorhydrol" (25 percent solids solution of basic aluminum chloride in water from Reheis Density = 13 lbs/ft$^3$
Fired linear shrinkage, two hrs. at 2300°F = 3.5 percent
Modulus of rupture, dry = 15 psi
  Fired four hrs. at 1000°F = 17 psi
  Fired two hrs. at 2300°F = 16 psi

EXAMPLE 15

A dilute slurry was prepared containing 2 lbs "Fiberfrax" ceramic fiber in 105 lbs water. To this slurry, 0.26 lb of Du Pont Positive Sol 130M was added with good stirring. Next, 0.12 lb of R. T. Vanderbilt Company's saponite mineral "Veegum" HV was added with good stirring, as a 6 percent suspension in water. A test pad was prepared and tested as described in Example 1 above. The weight ratio of constituents in this composite was 100 parts ceramic fiber: 4 parts positively charged binder: 6 parts negatively charged saponite mineral flocculent.

Density = 17.8 lbs/ft$^3$
Fired linear shrinkage, two hrs. at 2300°F = 4.0 percent
Modulus of rupture, dry = 48 psi
  Fired four hrs. at 1000°F = 60 psi
  Fired two hrs. at 2300°F = 46 psi

EXAMPLE 16

A dilute slurry was prepared containing 2 lbs "Fiberfrax" aluminosilicate refractory bulk fiber in 105 lbs water. To this slurry, 0.26 lb of Du Pont Positive Sol 130M was added with good stirring. Then, 0.12 lb of Minerals and Chemicals Philipp Corporation's attapulgus type clay "Attagel" 40 was added with good stirring as a 6 percent suspension in water. A test pad was vacuum formed, dried, and evaluated as described in Example 1 above. The weight ratio of constituents in this product was 100 parts ceramic fiber: 4 parts positively charged Du Pont Positive Sol 130M binder: 6 parts negatively charged "Attagel" 40 attapulgus clay flocculent. The results are given below.

Density = 17 lbs/ft$^3$
Fired linear shrinkage, two hrs. at 2300°F = 4.1 percent Modulus of rupture, dry = 20 psi
Fired four hrs. at 1000°F = 26 psi
Fired two hrs. at 2300°F = 33 psi

EXAMPLE 17

A dilute slurry was prepared containing 2 lbs "Fiberfrax" ceramic fiber in 105 lbs water. To this slurry, 0.26 lb of Du Pont Positive Sol 130M was added with good stirring. Then, 0.12 lb of negatively charged colloidal mineral flocculent was added consisting of a mixture of 95 percent by weight of "Volclay" bentonite and 5 percent "Veegum" HV saponite mineral. This mixture of solids was added as a 6 percent suspension in water. A test pad was vacuum formed, dried, and evaluated as described in Example 1 above. The weight ratio of constituents in this product was 100 parts ceramic fiber: 4 parts positively charged binder: 6 parts negatively charged mineral flocculent mixture.

Density = 18.4 lbs/ft$^3$
Fired linear shrinkage, two hrs. at 2300°F = 4.6%
Modulus of rupture, dry = 31 psi
Fired four hrs. at 1000°F = 40 psi
Fired two hrs. at 2300°F = 48 psi Examples 18 – 20 illustrate the prior art process using potassium titanate as a negatively charged flocculent for Du Pont Positive Sol 130M binder in refractory fiber bonded structures.

EXAMPLE 18

A dilute slurry was prepared containing 2 lbs "Fiberfrax" aluminosilicate refractory bulk fiber in 193 lbs water. To this slurry, 1 lb of Du Pont Positive Sol 130M (30 percent solids) was added with stirring. After stirring for an additional five minutes, 0.3 lb of Du Pont potassium titanate powder was added and the pH of the slurry was adjusted to 8.6 using ammonium hydroxide. After stirring for 30 more minutes, a test pad was prepared and physical properties were measured as described in Example 1. The weight ratio of ceramic fiber: positively charged binder: negatively charged PKT flocculent was 100:15:15.

Density = 15.9 lbs/ft$^3$
Fired linear shrinkage, two hrs. at 2300°F = 12.5 percent
Modulus of rupture, dry = 60 psi
Fired four hrs. at 1000°F = 78 psi
Fired two hrs. at 2300°F = 210 psi*

* Specimens distorted due to overfired condition.

From a processing standpoint, the slurry was difficult to filter despite the 1 percent (solids) concentration used in this example.

EXAMPLE 19

A dilute slurry was prepared containing 2 lbs "Fiberfrax" aluminosilicate refractory bulk fiber in 193 lbs water. To this slurry, 1 lb of Du Pont Positive Sol 130M (30 percent solids) was added with stirring. After stirring for an additional 5 minutes, 0.3 lb of Du Pont potassium titanate powder was added and the pH of the slurry was adjusted to 5.4 using dilute nitric acid. After stirring for 30 more minutes, an attempt was made to prepare a test pad by the usual vacuum forming procedure. It was impossible to form this pad as the slurry would not filter. In its highly dispersed state, the slurry could not be pulled by suction onto the screen. Only a thin precipitate collected on the screen.

EXAMPLE 20

A dilute slurry was prepared containing 2 lbs "Fiberfrax" ceramic fiber in 96.5 lbs water. To this slurry, 0.65 lb of Du Pont Positive Sol 130M was added with good stirring. Next, 0.2 lb of Du Pont potassium titanate powder was added and stirring was continued for another 30 minutes. The pH of the slurry was 6.5. A test pad was vacuum formed, dried in an oven at 230°F, and evaluated as described in Example 1 above. The weight ratio of constituents in this composite structure was 100 parts ceramic fiber: 10 parts positively charged binder: 10 parts negatively charged potassium titanate flocculent.

Density = 18.8 lbs/ft$^3$
Fired linear shrinkage, two hrs. at 2300°F = 11 percent
Modulus of rupture, dry = 7 psi
Fired four hrs. at 1000°F = 12 psi
Fired two hrs. at 2300°F = 99 psi*

* Specimens distorted due to overfired condition.

I claim:

1. An inorganic fibrous refractory composition consisting essentially of about 50 to 98 parts by weight inorganic refractory fibers and from about two to 50 parts by weight positively charged binder plus negatively charged flocculent, the binder being flocculated onto the fibers by the flocculent, the weight ratio of binder to flocculent being from 3:1 to 1:5, said binder being selected from the group consisting of (A) positively charged colloidal particles having a dense silica core and a coating of at least one of oxides, hydroxides and hydrated oxides of aluminum, chromium, titanium and zirconium, (B) colloidal amorphous fumed alumina, (C) colloidal boehmite alumina and (D) basic aluminum chloride, said flocculent being selected from the group consisting of montmorillonite, saponite, hectorite and attapulgite.

2. The composition of claim 1 wherein the binder is a sol of particles having a silica core coated with at least one of oxides, hydroxides, and hydrated oxides of aluminum, chromium, titanium and zirconium.

3. The composition of claim 2 wherein the ratio of binder to flocculent is from 2:3 to 4:3.

4. The composition of claim 2 having from 75 to 90 parts by weight inorganic refractory fibers and 10 to 25 parts by weight binder plus flocculent.

5. The composition of claim 4 wherein the flocculent is montmorillonite.

6. The composition of claim 2 wherein the flocculent is a mixture of montmorillonite and saponite.

7. In a process for binding inorganic refractory fibers with a binder selected from the group consisting of (A) positively charged colloidal particles having a silica core coated with at least one of oxides, hydroxides and hydrated oxides of aluminum, chromium, titanium and zirconium, (B) boehmite alumina, (C) fumed alumina and (D) basic aluminum chloride wherein the fibers and binder are slurried together and then filtered by vacuum forming to form a refractory object, the improvement comprising flocculating the binder onto the fibers with a flocculent selected from the group consisting of montmorillonite, attapulgite, saponite and hectorite.

8. A process according to claim 7 wherein the binder is a sol of particles having a silica core coated with at least one of oxides, hydroxides and hydrated oxides of aluminum, chromium, titanium and zirconium.

9. A process according to claim 7 wherein the ratio of binder to flocculent is from 2:3 to 4:3.

10. A process according to claim 7 having from 75 to 90 parts by weight inorganic refractory fibers and 10 to 25 parts by weight binder plus flocculent.

11. A process according to claim 10 wherein the flocculent is montmorillonite.

12. A process according to claim 7 wherein the flocculent is a mixture of montmorillonite and saponite.

* * * * *